US009483867B2

(12) United States Patent
Haanpaa et al.

(10) Patent No.: US 9,483,867 B2
(45) Date of Patent: *Nov. 1, 2016

(54) ORIENTATION INVARIANT OBJECT IDENTIFICATION USING MODEL-BASED IMAGE PROCESSING

(71) Applicant: Cybernet Systems Corporation, Ann Arbor, MI (US)

(72) Inventors: Douglas Haanpaa, Dexter, MI (US); Charles J. Cohen, Ann Arbor, MI (US); Glenn J. Beach, Grass Lake, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,124

(22) Filed: Jul. 14, 2015

(65) Prior Publication Data

US 2016/0093097 A1    Mar. 31, 2016

Related U.S. Application Data

(63) Continuation of application No. 14/242,560, filed on Apr. 1, 2014, now Pat. No. 9,082,219, which is a continuation of application No. 13/438,397, filed on Apr. 3, 2012, now Pat. No. 8,687,849, which is a continuation of application No. 11/938,484, filed on Nov. 12, 2007, now Pat. No. 8,150,101.

(60) Provisional application No. 60/865,521, filed on Nov. 13, 2006.

(51) Int. Cl.
*G06K 9/00* (2006.01)
*G06T 15/20* (2011.01)
*G06K 9/32* (2006.01)
(Continued)

(52) U.S. Cl.
CPC ............. *G06T 15/20* (2013.01); *G06K 9/0063* (2013.01); *G06K 9/3241* (2013.01); *G06K 9/6202* (2013.01); *G06T 3/20* (2013.01); *G06T 3/60* (2013.01); *G06T 7/20* (2013.01); *G06T 15/00* (2013.01); *G06T 15/10* (2013.01);
(Continued)

(58) Field of Classification Search
CPC .. G06K 9/0063; G06K 9/3241; G06T 15/00; G06T 15/10
See application file for complete search history.

(56) References Cited

U.S. PATENT DOCUMENTS 3,976,999 A   8/1976   Moore et al.
3,992,710 A   11/1976  Gabriele et al.
(Continued)

*Primary Examiner* — Gregory M Desire
(74) *Attorney, Agent, or Firm* — Dinsmore & Shohl LLP

(57) ABSTRACT

A system for performing object identification combines pose determination, EO/IR sensor data, and novel computer graphics rendering techniques. A first module extracts the orientation and distance of a target in a truth chip given that the target type is known. A second is a module identifies the vehicle within a truth chip given the known distance and elevation angle from camera to target. Image matching is based on synthetic image and truth chip image comparison, where the synthetic image is rotated and moved through a 3-Dimensional space. To limit the search space, it is assumed that the object is positioned on relatively flat ground and that the camera roll angle stays near zero. This leaves three dimensions of motion (distance, heading, and pitch angle) to define the space in which the synthetic target is moved. A graphical user interface (GUI) front end allows the user to manually adjust the orientation of the target within the synthetic images. The system also includes the generation of shadows and allows the user to manipulate the sun angle to approximate the lighting conditions of the test range in the provided video.

16 Claims, 5 Drawing Sheets

(51) Int. Cl.
*G06T 15/00* (2011.01)
*G06T 15/10* (2011.01)
*G06K 9/62* (2006.01)
*G06T 3/20* (2006.01)
*G06T 3/60* (2006.01)
*G06T 7/20* (2006.01)

(52) U.S. Cl.
CPC .............. *G06T2207/10012* (2013.01); *G06T 2207/30212* (2013.01)

(56) References Cited

U.S. PATENT DOCUMENTS

| | | |
|---|---|---|
| 4,243,972 A | 1/1981 | Toussaint |
| 4,497,065 A | 1/1985 | Tisdale et al. |
| 4,767,609 A | 8/1988 | Stavrianpoulos |
| 4,772,548 A | 9/1988 | Stavrianpoulos |
| 4,845,610 A | 7/1989 | Parvin |
| 4,847,817 A | 7/1989 | Au et al. |
| 4,950,050 A | 8/1990 | Pernick et al. |
| 4,972,193 A | 11/1990 | Rice |
| 5,202,783 A | 4/1993 | Holland et al. |
| 5,210,799 A | 5/1993 | Rao |
| 5,258,924 A | 11/1993 | Call et al. |
| 5,324,829 A | 6/1994 | Bahl et al. |
| 5,339,082 A | 8/1994 | Norsworthy |
| 5,521,298 A | 5/1996 | Bahl et al. |
| 5,524,845 A | 6/1996 | Sims et al. |
| 5,566,246 A | 10/1996 | Rao |
| 6,042,050 A | 3/2000 | Sims et al. |
| 6,118,886 A | 9/2000 | Baumgart et al. |
| 6,351,573 B1 | 2/2002 | Schneider |
| 6,437,728 B1 | 8/2002 | Richardson et al. |
| 6,491,253 B1 | 12/2002 | McIngvale |
| 6,597,800 B1 | 7/2003 | Murray et al. |
| 6,608,563 B2 | 8/2003 | Weston et al. |
| 6,813,593 B1 | 11/2004 | Berger |
| 6,894,639 B1 | 5/2005 | Katz |
| 7,003,137 B2 | 2/2006 | Ohta |
| 7,006,944 B2 | 2/2006 | Brand |
| 7,030,808 B1 | 4/2006 | Repperger et al. |
| 7,040,570 B2 | 5/2006 | Sims et al. |
| 7,137,162 B2 | 11/2006 | Spencer et al. |
| 7,205,927 B2 | 4/2007 | Krikorian et al. |
| 7,227,801 B2 | 6/2007 | Kikutake et al. |
| 7,227,973 B2 | 6/2007 | Ishiyama |
| 7,274,801 B2 | 9/2007 | Lee |
| 7,773,773 B2 | 8/2010 | Abercrombie et al. |
| 7,848,566 B2 | 12/2010 | Schneiderman |
| 2005/0286767 A1 | 12/2005 | Hager et al. |
| 2007/0264617 A1 | 11/2007 | Richardson et al. |
| 2008/0273210 A1* | 11/2008 | Hilde .................... G01S 7/4802 356/601 |
| 2009/0074249 A1* | 3/2009 | Moed ................ G06K 9/00818 382/104 |

* cited by examiner

| Target Image | M60 | ZSU-23 | M35 | M113 | M110A2 |
|---|---|---|---|---|---|
| M60 | 71.43% | 0.00% | 7.14% | 14.29% | 7.14% |
| ZSU-23 | 0.00% | 59.23% | 18.52% | 22.22% | 0.00% |
| M35 | 0.00% | 0.00% | 96.30% | 3.70% | 0.00% |
| M113 | 0.00% | 0.00% | 0.00% | 88.89% | 11.11% |
| M110A2 | 3.70% | 0.00% | 0.00% | 0.00% | 96.30% |

FIGURE 5

| Vehicle Type | ID w/o Shadow | ID with Shadow |
|---|---|---|
| M10A2 | M60 | M10A2 |
| M10A2 | M60 | M60 |
| M60 | M60 | M60 |
| M60 | M60 | M60 |
| M60 | ZSU23 | M60 |
| M113 | M113 | M113 |
| M113 | M113 | M113 |
| ZSU23 | M113 | ZSU23 |
| ZSU23 | M113 | ZSU23 |
| M35 | M35 | M35 |

FIGURE 6

ORIENTATION INVARIANT OBJECT IDENTIFICATION USING MODEL-BASED IMAGE PROCESSING

REFERENCE TO RELATED APPLICATION

This application is a continuation of U.S. patent application Ser. No. 14/242,560, filed Apr. 1, 2014, which is a continuation of U.S. patent application Ser. No. 13/438,397, filed Apr. 3, 2012, now U.S. Pat. No. 8,687,849, which is a continuation of U.S. patent application Ser. No. 11/938,484, filed Nov. 12, 2007, now U.S. Pat. No. 8,150,101, which claims priority from U.S. Provisional Patent Application Ser. No. 60/865,521, filed Nov. 13, 2006, the entire content of each application is incorporated herein by reference.

GOVERNMENT SUPPORT

This invention was made with Government support under Contract No. N68335-06-C-0065 awarded by the United States Navy. The Government has certain rights in the invention.

FIELD OF THE INVENTION

This invention relates generally to object identification, and in particular, to a system for performing object identification that combines pose determination, Electro-Optical/Infrared (EO/IR) sensor data, and novel computer graphics rendering techniques.

BACKGROUND OF THE INVENTION

Many automated processes require the ability to detect, track, and classify objects, including applications in factory automation, perimeter security, and military target acquisition. For example, a primary mission of U.S. military air assets is to detect and destroy enemy ground targets. In order to accomplish this mission, it is essential to detect, track, and classify contacts to determine which are valid targets. Traditional combat identification has been performed using all-weather sensors and processing algorithms designed specifically for such sensor data. EO/IR sensors produce a very different type of data that does not lend itself to the traditional combat identification algorithms.

SUMMARY OF THE INVENTION

This invention is directed to a system for performing object identification that combines pose determination, EO/IR sensor data, and novel computer graphics rendering techniques. The system is well suited to military target cueing, but is also extendable to detection and classification of other objects, including machined parts, robot guidance, assembly line automation, perimeter security, anomaly detection, etc.

The system serves as a foundation of an automatic classifier using a model-based image processing system, including multiple capabilities for use in the overall object identification process. This includes tools for ground truthing data, including a chip extraction tool, and for performing target identification.

The system comprises two main modules. The first is a module that is intended to extract the orientation and distance of a target in a truth chip (generated using the Chip Extraction Application) given that the target type is known. The second is a module that takes the attempts to identify the vehicle within a truth chip given the known distance and elevation angle from camera to target.

The system is capable of operating in the presence of noisy data or degraded information. Image matching is actually based on synthetic image and truth chip image comparison, where the synthetic image is rotated and moved through a three-Dimensional space. To limit the search space, it is assumed that the object is positioned on relatively flat ground and that the camera roll angle stays near zero. This leaves three dimensions of motion (distance, heading, and pitch angle) to define the space in which the synthetic target is moved. Synthetic imagery generated using a simulation library can be used to help train the system.

Next the rendered synthetic image and the truth chip is rendered in order to make them more comparable. A simple thresholding of the truth and synthetic images, followed by extracting the biggest blob from the truth chip is applied to the process. The system iterates within this 3D search space to perform an image match from the synthetic and truth images to find the best score.

The process of target recognition is very similar to that used for the distance/orientation determination. The only difference is the search space. Instead of varying the target distance, heading, and pitch, the search varies the target type and the heading.

A graphical user interface (GUI) front end allows the user to manually adjust the orientation of the target within the synthetic images. The system also includes the generation of shadows and allows the user to manipulate the sun angle to approximate the lighting conditions of the test range in the provided video. Manipulation of the test sun angle is a tedious process that could also be automated in much the same way as the distance/orientation determination. The application of shadows and sun angle to the process greatly improves overall target identification in outdoor conditions.

BRIEF DESCRIPTION OF THE DRAWINGS

FIG. 5 provides statistical data that shows how which vehicles are commonly mistaken for others; and FIG. 6 lists vehicle types with and without shadow data.

DETAILED DESCRIPTION OF THE INVENTION

Although this invention has numerous other applications as mentioned in the Summary, this disclosure resides primarily in new algorithms for performing the combat identification stage of the target cueing process by leveraging our existing CSMV pose determination system. The goal in this embodiment is to identify vehicle targets on the ground given the following data points:

1. A video feed from a camera platform updating at FPS frames per second.
    a. Resolution of the camera is I by I (this assumes a square image to make calculations easier and should suffice for the order-of-magnitude capabilities we are attempting to evaluate)
    b. Field of view is FoV degrees (both vertical and horizontal)

2. Target position in camera image space: $(i_t, j_t)$
   a. Accuracy of target position is dIJ
3. Target distance/range in meters: $R_t$
   a. Accuracy of target range is dR We evaluated the use of a model-based vision system to match wire-frame models of the library of known entities against the object in the sub-image given the above target location parameters. The system tests the model at many discrete points in a 6 DoF space to get the best match. Since the 6 Degree-of-Freedom search space is huge, this leads to the requirement for significant processing power. The time required to search is also lengthy so we investigated the following methods to limit the search space:

1. Cull Based on Target Position Information

The target position parameters provided constrain the position space significantly. In order to determine how much, we need to know dR (error in distance measure) and dIJ (error in target position within the image).

2. Extract Ground Orientation to Cull Target Orientation

Because the targets are ground vehicles, we may be able to assume that they are resting on the ground with their wheels/tracks down (i.e. not turned over on their side or upside down). This significantly constrains the orientation space. If we can determine the orientation of the ground (with respect to the camera platform) then we may be able to assume that the vehicles yaw axis points towards ground-normal. If so, then two of the orientation DoFs (pitch/azimuth and roll) are constrained. Let us denote the ground orientation angle accuracies for pitch and roll respectively by dGP and dGR.

3. Extract Target Dimensions to Cull Non-viable Target

Another way to constrain the system is to eliminate targets early in the process. This approach attempts to extract the length and width of the target in order to eliminate the majority of models.

Figure 1:
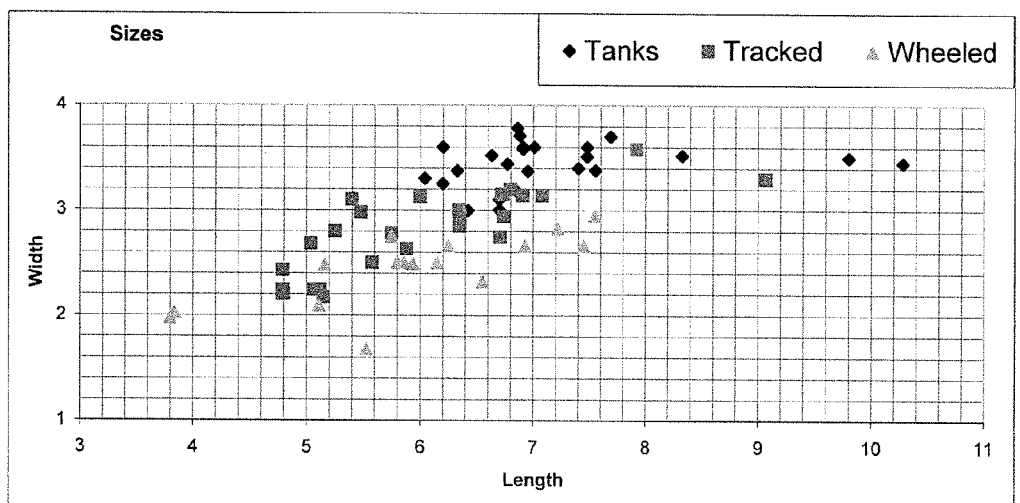
FIG. 1 is a plot that shows the lengths and widths of the vehicles of Table 1.

We performed a preliminary survey of a number of foreign tanks, tracked vehicles, and wheeled vehicles, as shown in FIG. 1. The plot of FIG. 1 shows the lengths and widths of these vehicles. From FIG. 1, we can see that length/width estimation with accuracy of 0.2 meters (one box in the above plot), would remove more than 90 percent of the vehicles. Given the above figure, we can divide the number of vehicles in the sample set by the number of cells that contain vehicle points to get a rough estimate of vehicle density in vehicles per square meter. If we do this, we get:

Number of vehicles=67
Number of 0.2 m×0.2 m cells that contain vehicles=50
Density in vehicles per 0.2 m×0.2 m cell=67/50=1.34
Density in vehicles per square meter=1.34*4*4=21.44
Density in fraction of vehicles per square meter=21.44/67=0.32

Figure 2:
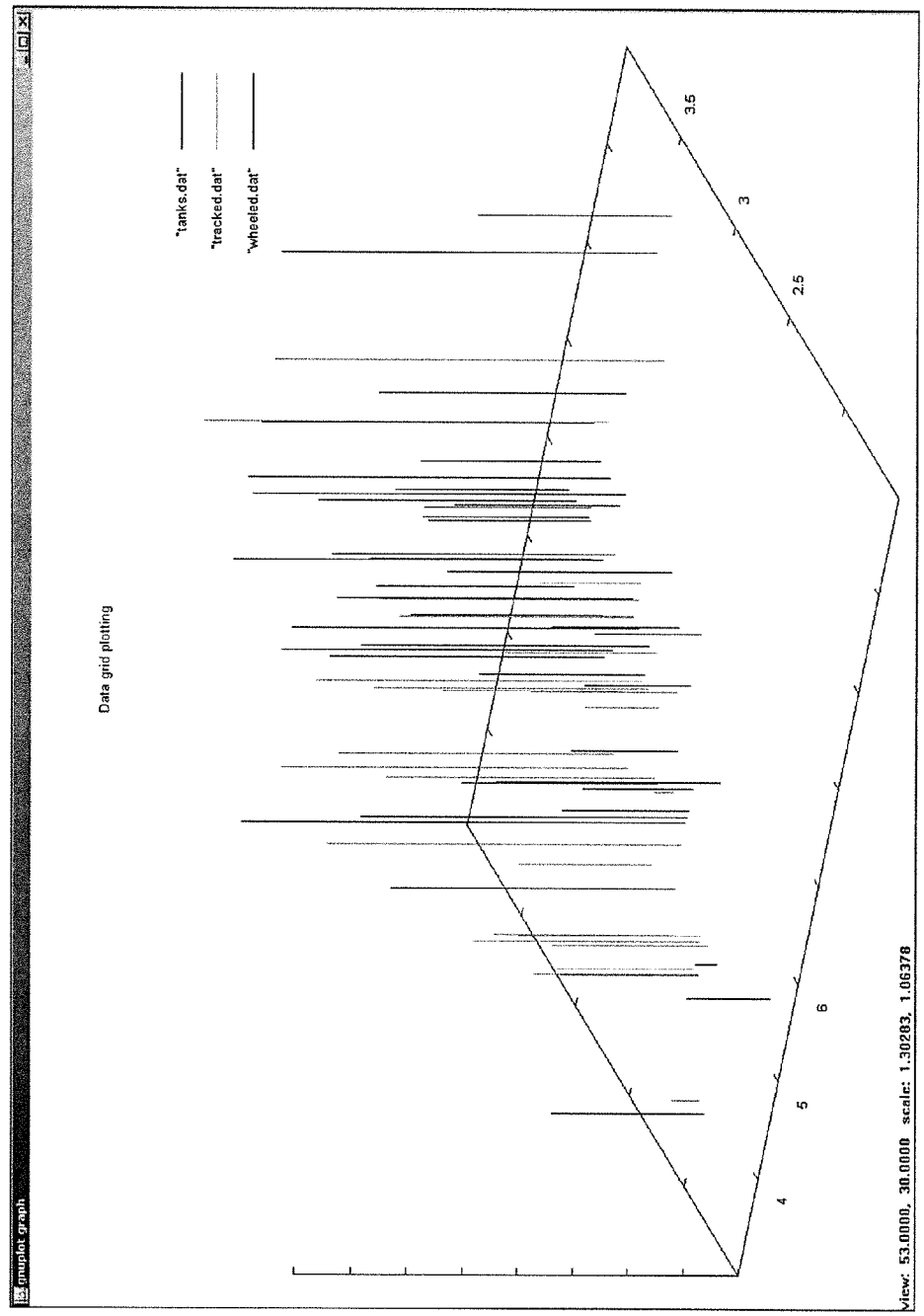
FIG. 2 is a plot showing that variation in vehicle height is not as dramatic as in length or even width.
Figure 3:
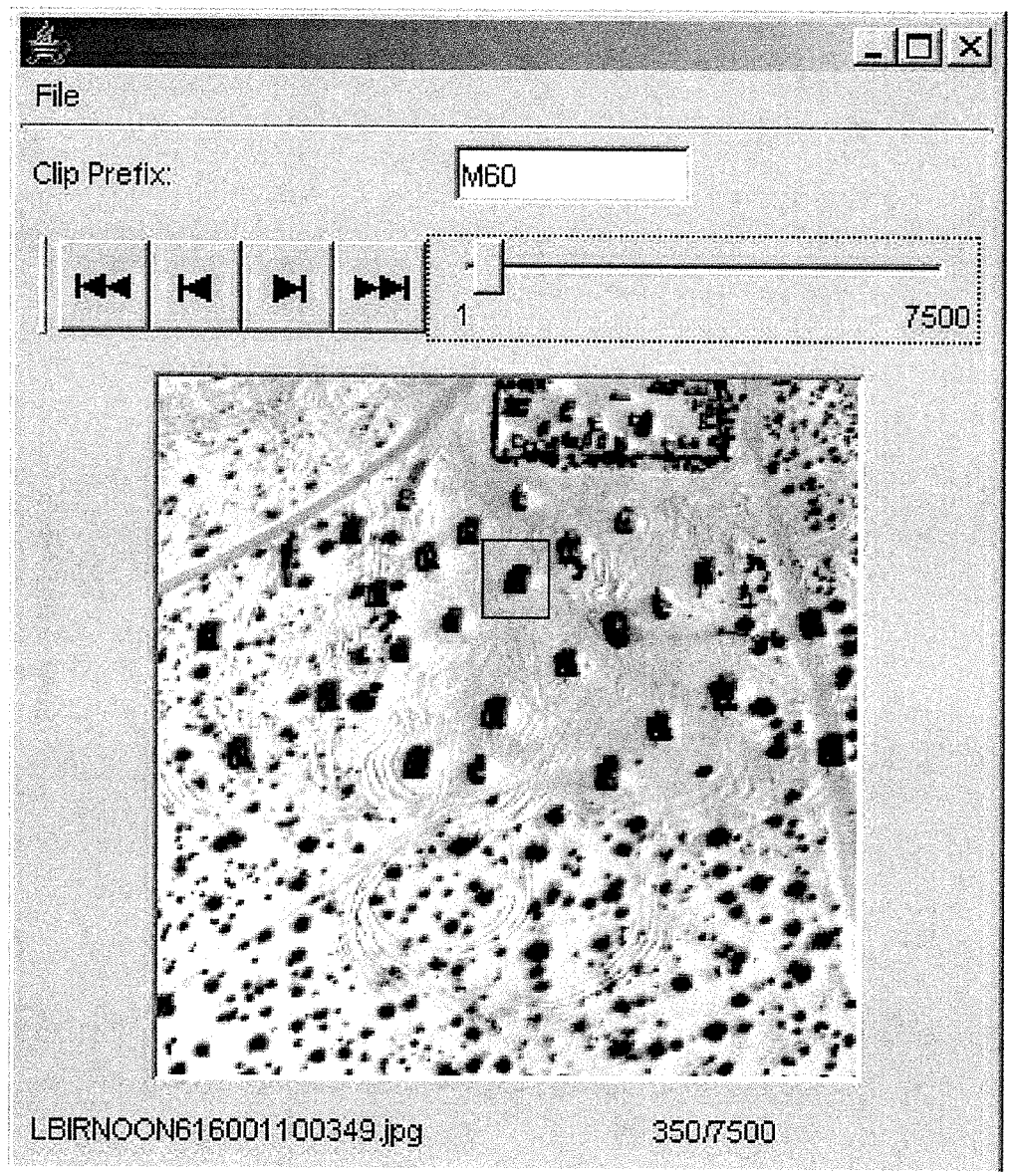
FIG. 3 is a graphical user interface showing a target object within a field of view.

The distance to the target object would necessarily effect estimation of length and width based on the image. Therefore, we will represent the length and width estimation as a fraction of the distance and call this constant dLWE. If we extract height information from the source video as well, then the culling may be more effective. Variation in height is not as dramatic as in length or even width, but it can factor into the culling process (see FIG. 2).

Based on the above calculations/assumptions we now evaluate the search space. A summary of the variables used is as follows:

FPS=Update rate of the camera in frames per second.
I=Resolution of camera
FoV=Field of View
$i_t, j_t$=Target position in camera image space
dIJ=Accuracy of target position $R_t$=Target range in meters
dR=Accuracy of target range (fraction of range distance)
dLWE=Accuracy of length and width estimations (fraction of range distance)
dGP, dGR=Accuracy of Ground orientation angles We start by predicting a baseline for these values and then calculating the search space from that. Prediction of the baseline is simply an estimate on our part, but we believe that these values are reasonable.

| Input Accuracies - current estimations | | |
|---|---|---|
| FPS | 10 fps | Update rate of the camera in frames per second |
| I | 256 pixels | Resolution of camera |
| FoV | 20° | Field of View |
| DI | 5 pixels | Accuracy of target position |
| $R_t$ | 1000 meters | Range/Distance to target in meters |
| DR | 0.03 | Accuracy of target range (fraction of range) |
| DLWE | 0.001 | Accuracy of length and width estimations (fraction of range) |
| DGA | 5° | Accuracy of Ground orientation angles |

We will also employ that rough estimate of size distribution in fraction of vehicles per square meter, which was estimated to be 0.32. Furthermore, we will assume a vehicle database size of 1000 vehicles.

From the information listed in the above table, we can now calculate the search space we must cover in terms of the possible candidate vehicles length/width envelop and the position/orientation search space that we must explore for each candidate vehicle that passes the length/width test.

| Search Space | |
|---|---|
| Number of models passing Length/Width Test | 320 |
| DoF X | 6.817687 |
| DoF Y | 6.817687 |
| DoF Z | 6.817687 |
| DoF Roll | 5 |
| DoF Pitch | 5 |
| DoF Heading | 360 |

Following through with the calculations, the total number of wireframe to image comparisons would be 105,630. Performance tests showed that the wireframe matching software is able to perform on the order of 10,000 wireframe comparisons per second on a 3.0 Ghz PC. This means that a database search of 1,000 vehicles, given all of the above parameters are correct, will take about 10 seconds.

Two modules were constructed to demonstrate our approach. The first was a module that was intended to extract the orientation and distance of a target in a truth chip (generated using the Chip Extraction Application) given that the target type is known. The second is a module that takes the attempts to identify the vehicle within a truth chip given the known distance and elevation angle from camera to target.

Orientation and Distance Extraction—Ground Truthing

To enhance performance, we assumed that some information about the target is known. Specifically, we assumed the distance to the target would be known to within a reasonable error (we assumed 5 percent). Furthermore, the information describing the camera's relative location to the target should be known. This information was extracted from the image chips themselves by implementing a code module that uses an image-matching algorithm that essentially searches a position and orientation space to find the best camera-to-target distance and orientation.

Image matching is actually based on synthetic image and truth chip image comparison, where the synthetic image is rotated and moved through a 3-Dimensional space. To limit the search space, we assumed that the vehicle was positioned on relatively flat ground and that the camera roll angle stayed near zero. This left three dimensions of motion (distance, heading, and pitch angle) to define the space in which the synthetic target is moved.

Synthetic imagery was generated by using Cybernet's cnsFoundation simulation library. This library is able to read object models formatted in an Alias-wavefront derived format called OBJ that were converted from 3Dstudio Max files that were purchased from a company called TurboSquid[1] that maintains a large repository of 3D models. CnsFoundation reads these files and then renders them using the OpenGL API which takes advantage of hardware graphics acceleration.

Once the vehicle in a given orientation is rendered using cnsFoundation, the image is extracted and piped into Cybernet's image processing suite CSCImage, which is based upon and adds to the functionality of the OpenCV[2] image processing software written by Intel. Using CSCImage, we are able to process the rendered synthetic image and the truth chip in order to make them more comparable. We found that a simple thresholding of the truth and synthetic images, followed by extracting the biggest blob from the truth chip yielded the best results.

Figure 4:
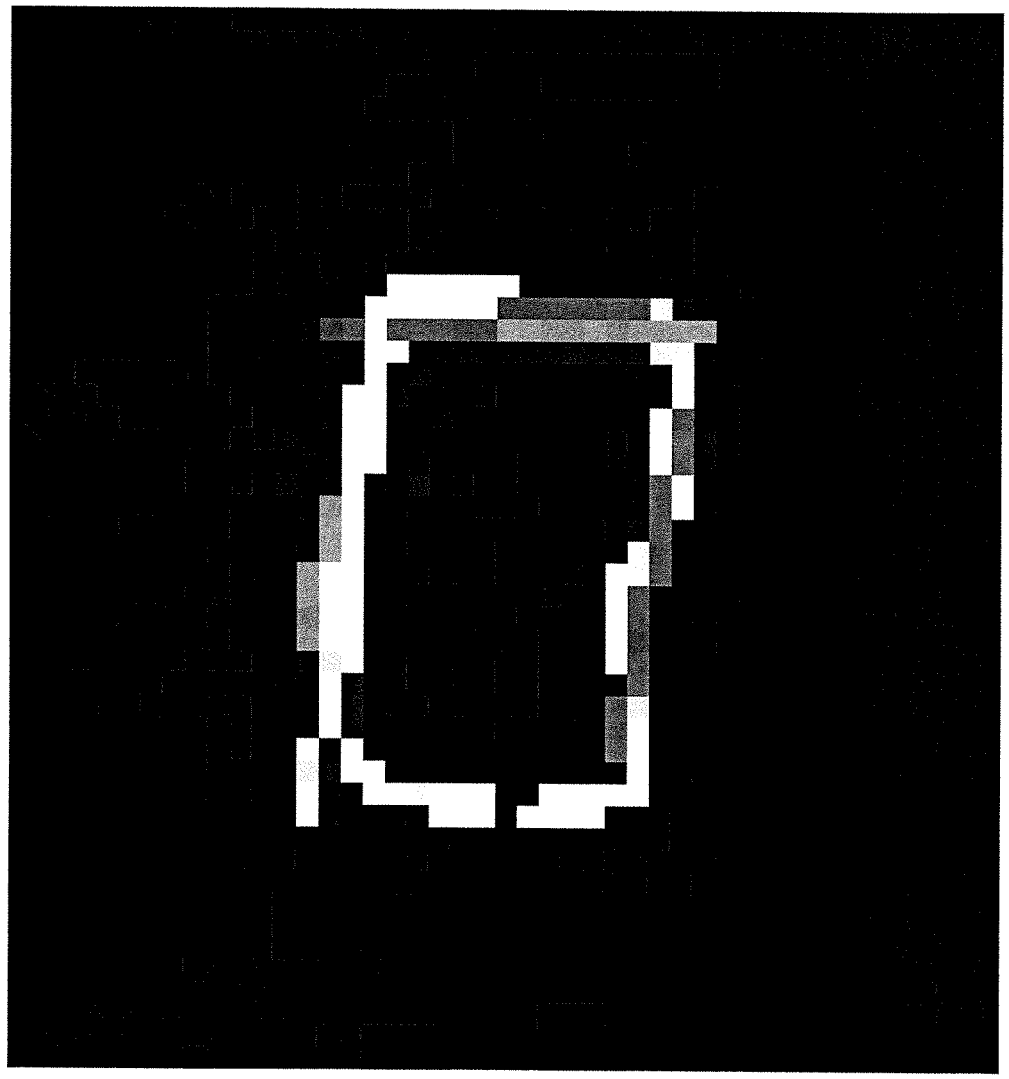
FIG. 4 illustrates the generation of edge boundaries.

We considered the possibility of using edge images to perform the comparison. This yielded about the same results as the thresholded images. We also looked into the possibility of extracting the significant edges within these edge images, in order to significantly reduce the search space of the ATR algorithm. As seen in FIG. 4, we were able to find a number of edges on a target as seen from directly overhead. We did, however, find that when the pixels-on-target were as few as the typical truth-chip images, edge determination for oblique camera angles were untrustworthy.

By iterating within this 3D search space, we then perform an image match from the synthetic and truth images to find the best score. We were able to find the correct orientation/distance for the target vehicle approximately 50% of the time. One of the biggest problems we encountered was the presence of shadows that distorted the size of the target profiles in the truth image chips.

Target Recognition/Identification

The process of target recognition is very similar to that used for the distance/orientation determination. The only difference is the search space. Instead of varying the target distance, heading, and pitch, the search varied the target type and the heading. For this demonstration, the number of types was 5 (i.e. the M10A2 howitzer, M35 truck, M60 tank, M113 APC, and ZSU23 anti-aircraft). At the end of the search/image-matching process, the vehicle/orientation with the best score identifies the target either correctly or not.

For those truth chips where the distance and orientation were incorrect (correctness was evaluated by manual inspection), the algorithm, as expected, did only slightly better than would a random selection of the target ID (i.e. 1 in 5). In those cases where the distance and orientation were correct, however, the ATR performed much better. The recognition rate was about 80 percent.

The results of this experiment provided information about when and why identification failed. This information could be gleaned from the input and intermediate images that were saved during execution of ATR and also from the statistical data that shows how which vehicles are commonly mistaken for others (see FIG. 5). Some of the reasons for misidentification include:

1. Incorrect model (e.g. the M35 truck model has a different payload than the one on the test range.
2. Articulated model (e.g. the M10A2 model has its recoil "shovel" in a different position than the one at the test range).
3. Shadows (i.e. shadows make the vehicles look bigger than they actually are or they distort the geometry)

Graphical ATR Application—Inclusion of Shadows

A graphical GUI front end onto the system allows the user to manually adjust the orientation of the target within the synthetic images. The generation of shadows allowed the user to manipulate the sun angle to approximate the lighting conditions of the test range in the provided video. Manipulation of the test sun angle is a very manual process that could also be automated in much the same way that the distance/orientation determination is.

With shadows enabled, we were able to achieve better than 90% recognition rate (see FIG. 6) although, due to the amount of manual sun-angle adjustment that had to be done, the number of test targets was only 12. The recognition rate below 100% was attributable to a disagreement between the M110A2 model that we obtained from TurboSquid versus the M110A2 vehicle that was actually in the imagery. This was most likely a result of articulation within the vehicle that was not allowed for in the model.

TABLE 1

Vehicle Dimensions

| Veh | Country | Type | MoreType | overall length | case length | width | Height |
|---|---|---|---|---|---|---|---|
| AMX 30 | EU | Tank | Tank | 9.5 | 6.7 | 3.1 | 2.85 |
| Challenger 1 | EU | Tank | Tank | 11.5 | 9.8 | 3.5 | 2.95 |
| Challenger 2 | EU | Tank | Tank | 11.55 | 8.327 | 3.52 | 2.49 |
| FV4201 Chieftain Main Battle Tank | EU | Tank | Tank | | 7.48 | 3.51 | 2.9 |
| Centurion | EU | Tank | Tank | | 7.552 | 3.378 | 2.94 |
| Leclerc | EU | Tank | Tank | 9.87 | 6.88 | 3.71 | 2.53 |
| Leopard 1 A5 | EU | Tank | Tank | 9.54 | 6.95 | 3.37 | 2.62 |
| Leopard 2 | EU | Tank | Tank | | 7.69 | 3.7 | 2.79 |
| M-84 | Russia | Tank | Tank | 9.5 | 6.91 | 3.6 | 2.2 |
| IS-2 Heavy Tank | Russia | Tank | Tank | 10.74 | 6.77 | 3.44 | 2.93 |
| T54/T55 Series | Russia | Tank | Tank | | 6.2 | 3.6 | 2.32 |

TABLE 1-continued

Vehicle Dimensions

| Veh | Country | Type | MoreType | overall length | case length | width | Height |
|---|---|---|---|---|---|---|---|
| T62 Series | Russia | Tank | Tank | | 6.63 | 3.52 | 2.4 |
| T-64 | Russia | Tank | Tank | 9.2 | 7.4 | 3.4 | 2.2 |
| T72 | Russia | Tank | Tank | | 6.91 | 3.58 | 2.19 |
| T-80 | Russia | Tank | Tank | | 7.01 | 3.6 | 2.2 |
| T-90 | Russia | Tank | Tank | 9.53 | 6.86 | 3.78 | 2.225 |
| Type 59 | China | Tank | Tank | | 6.04 | 3.3 | 2.59 |
| Type 69 | China | Tank | Tank | | 6.1976 | 3.2512 | 2.794 |
| Type 80 | China | Tank | Tank | 9.328 | 6.325 | 3.372 | 2.29 |
| Type 85 | China | Tank | Tank | | 10.28 | 3.45 | 2.3 |
| Type 74 MBT | Japan | Tank | Tank | 9.41 | 6.85 | 3.18 | 2.67 |
| Type 88 K1 | South Korea | Tank | Tank | 9.67 | 7.48 | 3.6 | 2.25 |
| VCC 80 Dart | EU | Tank | Tank | | 6.7 | 3 | 2.64 |
| M-80 | Yugoslavia | Tank | tank (Infantry Combat Vehicle) | | 6.42 | 2.995 | 2.2 |
| AMX 10 P | EU | APC | Tracked Amphibious | | 5.75 | 2.78 | 2.57 |
| AMX 10 RC | EU | ARV | Tracked Amphibious | 9.13 | 6.35 | 2.95 | 2.59 |
| FV 430 Series | EU | APC | Tracked Utility | | 5.25 | 2.8 | 2.28 |
| Sabre | EU | TRV | Tracked Recon | | 5.15 | 2.17 | 2.17 |
| Samaritan | EU | APC | Tracked armoured ambulance | | 5.07 | 2.24 | 2.42 |
| Samson | EU | TRV | Tracked Armoured Recovery | | 4.79 | 2.43 | 2.25 |
| Scimitar | EU | | Tracked Combat Vehicle Reconnaissance | | 4.79 | 2.24 | 2.1 |
| Scorpion | EU | | Tracked armoured personnel carrier | | 4.79 | 2.2 | 2.1 |
| SK 105 Kurassier | EU | | Light Tank | 7.76 | 5.58 | 2.5 | 2.88 |
| Spartan | EU | | Tracked Combat Vehicle Reconnaissance | | 5.12 | 2.24 | 2.26 |
| Striker | EU | | Tracked Combat Vehicle Reconnaissance | | 4.8 | 2.2 | 2.2 |
| VCC-1 Camallino | EU | | Tracked Armoured Combat | | 5.04 | 2.68 | 2.08 |
| Warrior | EU | | Tracked Armoured Combat | | 6.34 | 3 | 2.78 |
| AS 90 155mm | EU | | Self Propelled Howitzer | | 9.07 | 3.3 | 3 |
| PzH 2000 | EU | | Self Propelled Howitzer | 11.669 | 7.92 | 3.58 | 3.06 |
| BMD-1 | Russia | | Tracked APC | | 6.74 | 2.94 | 2.15 |
| BMD-3 | Russia | | Tracked APC | | 6 | 3.13 | 2.25 |
| BMP-1 | Russia | | Tracked APC | | 6.7056 | 2.7432 | 2.1336 |
| BMP-2 | Russia | | Tracked APC | | 6.72 | 3.15 | 2.45 |
| BMP-3 | Russia | | Tracked APC | | 6.73 | 3.15 | 2.45 |
| BTR-50P | Russia | | Tracked Amphibious APC | | 7.08 | 3.14 | 1.97 |
| BTR-D | Russia | | Tracked APC | | 5.88 | 2.63 | 1.67 |
| MT-LB | Russia | | Tracked Armored Amphibious | | 6.35 | 2.85 | 1.87 |
| PT-76 | Russia | | Tank (Amphibious) | | 6.91 | 3.14 | 2.26 |
| Type 63 | China | | Tracked APC | | 5.48 | 2.98 | 2.85 |
| Type 89 | Japan | | Mini Tank | | 6.8 | 3.2 | 2.5 |
| Type 85 | North Korea | | Tracked APC | | 5.4 | 3.1 | 2.59 |
| AML-90 | EU | LAV | Light Armored Car | 5.48 | 3.8 | 1.97 | 2.15 |
| BMR-600 | EU | LAV | 6-Wheel Light Armored | | 6.15 | 2.5 | 2 |
| Piranha | EU | LAV | 6-Wheel Light Armored | | 6.25 | 2.66 | 1.985 |
| Piranha | EU | LAV | 8-Wheel Light Armored | | 6.93 | 2.66 | 1.985 |
| Piranha | EU | LAV | 10-Wheel Light Armored | | 7.45 | 2.66 | 1.985 |
| Fiat 6614G | EU | APC | 4X4 Armored Car | | 5.86 | 2.5 | 2.78 |
| Puma | EU | LAV | 4X4 Armored Car | | 5.108 | 2.09 | 1.678 |
| Puma | EU | LAV | 6x6 Armored Car | | 5.526 | 1.678 | 1.9 |
| Saxon | EU | APC | wheeled Armoured Personnel Carrier | | 5.16 | 2.48 | 2.63 |
| VAB | EU | | wheeled Armoured Personnel Carrier | | 5.94 | 2.49 | 2.06 |
| VBL | EU | | wheeled Armoured Personnel Carrier | | 3.84 | 2.02 | 1.7 |
| BOV | Yugoslavia | | wheeled Armoured Personnel Carrier | | 5.8 | 2.5 | 3.2 |
| BRDM-2 | Russia | | Wheeled ARV | | 5.75 | 2.75 | 2.31 |
| BTR-152 | Russia | | Wheeled APC | | 6.55 | 2.32 | 2.41 |
| BTR-60 | Russia | | 8-Wheel APC | | 7.22 | 2.82 | 2.06 |
| BTR-80 | Russia | | 8-Wheel APC | | 7.55 | 2.95 | 2.41 |

The invention claimed is:

1. A method of identifying an object, comprising the steps of:
   a) storing geometric information about a plurality of candidate objects in a computer memory;
   b) imaging a target object to be identified with a camera;
   c) providing a processor with access to the computer memory and the target object identified by the camera, the processor being operative to render the stored geometric information to a simulated image of the target object utilizing pose and environment information, the processor being further programmed to perform the following steps:

d) comparing the image of the target object to the stored geometric information;
e) rotating and moving the image of the target object in three-dimensional space;
f) repeating steps c), d) and e) to determine the best match or matches between the target object and the candidate objects.

2. The method of claim 1, wherein:
the target object is imaged at a distance; and
it is assumed that the target object is positioned on relatively flat ground and that the camera roll angle stays near zero.

3. The method of claim 1, wherein:
the target object is imaged at a distance; and
three dimensions of motion (distance, heading, and pitch angle) are used to define the space in which the target object is moved.

4. The method of claim 1, further including the step of thresholding the images of the candidate objects and target object.

5. The method of claim 1, further including the step of providing a graphical user interface (GUI) allowing a user to manually adjust the orientation of the target object.

6. The method of claim 1, further including the step of generating and manipulating shadows during the comparisons between target object and the candidate objects.

7. The method of claim 1, wherein a graphics processor unit is utilized to perform rendering and comparison to greatly enhance processing speed.

8. A method of indentifying a land vehicle, comprising the steps of:
a) providing a computer memory and storing geometric information about a plurality of candidate vehicles in the memory;
b) providing a camera and imaging a target vehicle to be identified with the camera;
c) providing a processor with access to the computer memory and the target object identified by the camera, the processor being operative to render the stored geometric information to a simulated image of the target object utilizing pose and environment information, the processor being further programmed to perform the following steps:
d) comparing the image of the target object to the stored geometric information;
e) rotating and moving the image of the target object in three-dimensional space;
f) repeating steps c), d) and e) to determine the best match or matches between the target object and the candidate objects.

9. The method of claim 8, wherein:
the target vehicle is imaged at a distance; and
it is assumed that the target vehicle is positioned on relatively flat ground and that the camera roll angle stays near zero.

10. The method of claim 8, wherein:
the target vehicle is imaged at a distance; and
three dimensions of motion (distance, heading, and pitch angle) are used to define the space in which the target vehicle is moved.

11. The method of claim 8, further including the step of thresholding the images of the candidate vehicles and target vehicle.

12. The method of claim 8, further including the step of providing a graphical user interface (GUI) allowing a user to manually adjust the orientation of the target vehicle.

13. The method of claim 8, further including the step of generating and manipulating shadows during the comparisons between target vehicle and the candidate vehicles.

14. The method of claim 8, wherein the target vehicle is a military vehicle.

15. The method of claim 8, wherein the target vehicle is a tank.

16. The method of claim 8, wherein a graphics processor unit is utilized to perform rendering and comparison to greatly enhance processing speed.

* * * * *